(12) United States Patent
Park

(10) Patent No.: US 11,554,626 B2
(45) Date of Patent: Jan. 17, 2023

(54) APPARATUS AND METHOD FOR ADJUSTING HEIGHT OF VEHICLE

(71) Applicant: Hyundai Mobis Co., Ltd., Seoul (KR)

(72) Inventor: Jun Sung Park, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 520 days.

(21) Appl. No.: 16/698,007

(22) Filed: Nov. 27, 2019

(65) Prior Publication Data
US 2021/0053410 A1  Feb. 25, 2021

(30) Foreign Application Priority Data

Aug. 22, 2019 (KR) .......................... 10-2019-0102922

(51) Int. Cl.
| | | |
|---|---|---|
| B60G 17/0195 | (2006.01) | |
| B60G 17/015 | (2006.01) | |
| B60G 17/016 | (2006.01) | |
| B60G 17/08 | (2006.01) | |

(52) U.S. Cl.
CPC ....... B60G 17/0195 (2013.01); B60G 17/016 (2013.01); B60G 17/0152 (2013.01); B60G 17/08 (2013.01); B60G 2400/204 (2013.01); B60G 2400/252 (2013.01); B60G 2400/92 (2013.01); B60G 2500/302 (2013.01); B60G 2800/914 (2013.01)

(58) Field of Classification Search
CPC ............ B60G 17/0195; B60G 17/0152; B60G 17/016; B60G 17/08; B60G 2400/204; B60G 2400/252; B60G 2400/92; B60G 2500/302; B60G 2800/914; B60G 17/0164; B60G 2400/50; B60G 2500/30; B60G 17/00; B60G 17/018; B60G 2400/25; B60T 11/103; B60T 13/686; B60T 17/043
See application file for complete search history.

(56) References Cited

U.S. PATENT DOCUMENTS

2005/0236781 A1 * 10/2005 Brookes ............... B60G 17/017
280/5.507

FOREIGN PATENT DOCUMENTS

| DE | 195 46 056 | 6/1997 | |
|---|---|---|---|
| DE | 10 2013 212 135 | 1/2015 | |
| EP | 1029761 A1 * | 8/2000 | ......... B60G 17/0195 |
| KR | 10-2003-0037303 | 5/2003 | |
| KR | 10-2005-0033713 | 4/2005 | |
| KR | 10-2006-0128623 | 12/2006 | |

OTHER PUBLICATIONS

C. W. Seo, KR 2003-0037303A Anti Dive System in Vehicle, Machine English Translation, ip.com (Year: 2003).*

* cited by examiner

*Primary Examiner* — Karen Beck

(74) *Attorney, Agent, or Firm* — H.C. Park & Associates, PLC

(57) ABSTRACT

An apparatus for adjusting a height of a vehicle including a vehicle height adjustment unit configured to adjust a height of the vehicle; a hydraulic pressure supply unit configured to supply a hydraulic pressure supplied to a caliper from a braking device for braking of the vehicle to the vehicle height adjustment unit; and a control unit configured to control a hydraulic pressure supplied to the vehicle height adjustment unit from the braking device, by controlling the hydraulic pressure supply unit depending on whether a predetermined vehicle height adjustment condition is satisfied.

16 Claims, 7 Drawing Sheets

APPARATUS AND METHOD FOR ADJUSTING HEIGHT OF VEHICLE

CROSS-REFERENCE TO RELATED APPLICATION

This application claims priority from and the benefit of Korean Patent Application No. 10-2019-0102922, filed on Aug. 22, 2019, which is hereby incorporated for all purposes as if set forth herein.

BACKGROUND

Field

Exemplary embodiments of the present disclosure relate to an apparatus and method for adjusting a height of a vehicle, and more particularly, to an apparatus and method for adjusting a height of a vehicle which adjust a vehicle height by sharing a hydraulic pressure of a braking device for braking a vehicle.

Discussion of the Background

The suspension of a vehicle absorbs vibration and/or shocks transferred from a road during travel, and thereby improves ride quality and stability. The suspension is connected to an axle and a frame by mean of a spring, a shock absorber, a stabilizer, and a rubber spring.

An electronic control suspension (ECS) includes a front solenoid valve, a rear solenoid valve, a front strut unit, front and rear vehicle height sensors, a compressor, an exhaust solenoid valve, a reservoir tank, an air supply valve, a pressure switch, and an ECS mode selection switch.

The front solenoid valve (for a front wheel) and the rear solenoid valve (for a rear wheel) switch the characteristic of the suspension to hard or soft by adjusting an air pressure and opening/closing solenoid valves during adjustment of a height of a vehicle. The front strut unit incorporates therein an air spring chamber and a two-staged damping force switching valve, and performs functions of selecting a spring constant and a damping force to hard and soft and adjusting a height of the vehicle. The front and rear vehicle height sensors detect heights of front and rear parts of the vehicle, and the compressor generates compressed air needed for raising a height of the vehicle and switching to hard and soft. The exhaust solenoid valve opens an air valve to discharge an air pressure when lowering a height of the vehicle, the reservoir tank stores an air pressure generated in the compressor, the air supply valve supplies an air pressure by opening an air valve when raising a height of the vehicle, and the pressure switch senses an air pressure in the reservoir tank and thereby controls a compressor relay through an on/off switching function.

Since the suspension includes a variety of mechanical and electrical parts as described above, problems may arise in that the number of parts of the vehicle increases and the vehicle is mechanically and structurally complicated. Therefore, there is a need to solve these problems.

The above information disclosed in this Background section is only for enhancement of understanding of the background of the invention and, therefore, it may contain information that does not constitute prior art.

SUMMARY

Exemplary embodiments of the present invention provide an apparatus and method for adjusting a height of a vehicle which adjust a vehicle height by sharing a hydraulic pressure of a braking device for braking a vehicle.

Additional features of the invention will be set forth in the description which follows, and in part will be apparent from the description, or may be learned by practice of the invention.

An exemplary embodiment of the present invention provides an apparatus for adjusting a height of a vehicle, including: a vehicle height adjustment unit configured to adjust a height of the vehicle; a hydraulic pressure supply unit configured to supply a hydraulic pressure supplied to a caliper from a braking device for braking of the vehicle to the vehicle height adjustment unit; and a control unit configured to control a hydraulic pressure supplied to the vehicle height adjustment unit from the braking device by controlling the hydraulic pressure supply unit depending on whether a predetermined vehicle height adjustment condition is satisfied.

The apparatus may further include a vehicle height detection unit configured to detect a vehicle height, in which the control unit controls the hydraulic pressure supply unit depending on a comparison result by comparing the vehicle height detected by the vehicle height detection unit with a predetermined target vehicle height.

The hydraulic pressure supply unit may include a hydraulic pressure supply valve installed in the braking device, and configured to regulate a hydraulic pressure supplied from the braking device; and a hydraulic pressure line having one end connected to the hydraulic pressure supply valve and the other end connected to the vehicle height adjustment unit, and configured to supply a hydraulic pressure from the hydraulic pressure supply valve to the vehicle height adjustment unit.

The hydraulic pressure supply unit may include a hydraulic pressure line having one end connected to the braking device and the other end connected to the vehicle height adjustment unit, and configured to supply a hydraulic pressure from the braking device to the vehicle height adjustment unit; and a hydraulic pressure supply valve installed on the hydraulic pressure line and configured to regulate a hydraulic pressure supplied through the hydraulic pressure line.

The control unit may supply a hydraulic pressure from the braking device to the vehicle height adjustment unit by controlling the hydraulic pressure supply unit depending on whether an operation state of the vehicle satisfies a predetermined braking condition.

The control unit may supply a hydraulic pressure from the braking device to the vehicle height adjustment unit by controlling the hydraulic pressure supply unit when the braking condition is not satisfied.

When the braking condition is satisfied, the control unit may supply a hydraulic pressure from the braking device to the vehicle height adjustment unit by controlling the hydraulic pressure supply unit depending on a comparison result by comparing a hydraulic pressure supplied to the caliper from the braking device with a predetermined hydraulic pressure.

If a hydraulic pressure supplied to the caliper is equal to or higher than the predetermined hydraulic pressure, the control unit may supply a hydraulic pressure from the braking device to both the vehicle height adjustment unit and the caliper by controlling the hydraulic pressure supply unit.

If a hydraulic pressure supplied to the caliper is lower than the predetermined hydraulic pressure, the control unit may supply a hydraulic pressure from the braking device to the vehicle height adjustment unit by controlling the hydraulic pressure supply unit when the vehicle is stopped.

The predetermined hydraulic pressure may be a target braking pressure that is necessary to be supplied to the caliper from the braking device.

The control unit may determine whether the vehicle height adjustment condition is satisfied based on at least one of: a vehicle height adjustment button input, a vehicle speed, a traveling time, and a vehicle position.

Another exemplary embodiment of the present invention provides a method for adjusting a height of a vehicle including: determining whether a predetermined vehicle height adjustment condition is satisfied, by a control unit; detecting a vehicle height by a vehicle height detection unit when the vehicle height adjustment condition is satisfied; and adjusting, by the control unit, the vehicle height by supplying a hydraulic pressure supplied through a hydraulic pressure supply unit from a braking device for braking of the vehicle to a vehicle height adjustment unit, depending on the vehicle height.

The hydraulic pressure supply unit may include a hydraulic pressure supply valve installed in the braking device, and configured to regulate a hydraulic pressure supplied from the braking device; and a hydraulic pressure line having one end connected to the hydraulic pressure supply valve and the other end connected to the vehicle height adjustment unit, and configured to supply a hydraulic pressure from the hydraulic pressure supply valve to the vehicle height adjustment unit.

The hydraulic pressure supply unit may include a hydraulic pressure line having one end connected to the braking device and the other end connected to the vehicle height adjustment unit, and configured to supply a hydraulic pressure from the braking device to the vehicle height adjustment unit; and a hydraulic pressure supply valve installed on the hydraulic pressure line and configured to regulate a hydraulic pressure supplied through the hydraulic pressure line.

In the adjusting of the vehicle height, the control unit may supply a hydraulic pressure from the braking device to the vehicle height adjustment unit by controlling the hydraulic pressure supply unit when an operation state of the vehicle does not satisfy a predetermined braking condition.

In the adjusting of the vehicle height, when an operation state of the vehicle satisfies the predetermined braking condition, the control unit may supply a hydraulic pressure from the braking device to the vehicle height adjustment unit by controlling the hydraulic pressure supply unit depending on a comparison result by comparing a hydraulic pressure supplied to a caliper from the braking device with a predetermined hydraulic pressure.

In the adjusting of the vehicle height, if a hydraulic pressure supplied to the caliper is equal to or higher than the predetermined hydraulic pressure, the control unit may supply a hydraulic pressure from the braking device to both the vehicle height adjustment unit and the caliper by controlling the hydraulic pressure supply unit.

In the adjusting of the vehicle height, if a hydraulic pressure supplied to the caliper is lower than the predetermined hydraulic pressure, the control unit may supply a hydraulic pressure from the braking device to the vehicle height adjustment unit by controlling the hydraulic pressure supply unit when the vehicle is stopped.

The predetermined hydraulic pressure may be a target braking pressure that is necessary to be supplied to the caliper from the braking device.

In the determining of whether the predetermined vehicle height adjustment condition is satisfied, the control unit may determine whether the vehicle height adjustment condition is satisfied based on at least one of: a vehicle height adjustment button input, a vehicle speed, a traveling time, and a vehicle position.

In the apparatus and method for adjusting a height of a vehicle according to the inventive concepts, by adjusting a vehicle height by sharing a hydraulic pressure of a braking device for braking a vehicle controlling various hydraulic pressures in the vehicle, the number of parts necessary for vehicle height adjustment may be reduced, and various electrical modules in the vehicle may be simplified mechanically and structurally.

Also, in the apparatus and method for adjusting a height of a vehicle according to the inventive concepts, since the number of mechanical and structural devices for vehicle height adjustment may be reduced, a cost and a time required for manufacturing a vehicle may be significantly decreased.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Hereinafter, an apparatus and method for adjusting a height of a vehicle will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

As publicly known in the art, some of exemplary embodiments may be illustrated in the accompanying drawings from the viewpoint of function blocks, units and/or modules. Those skilled in the art will understood that such blocks, units and/or modules are physically implemented by electronic (or optical) circuits such as logic circuits, discrete components, processors, hard wired circuits, memory devices and wiring connections. When the blocks, units and or modules are implemented by processors or other similar hardware, the blocks, units and modules may be programmed and controlled through software (for example, codes) in order to perform various functions discussed in this specification. Furthermore, each of the blocks, units and/or modules may be implemented by dedicated hardware or a combination of dedicated hardware for performing some functions and a processor for performing another function (for example, one or more programmed processors and related circuits). In some exemplary embodiments, each of the blocks, units and/or modules may be physically divided into two or more blocks, units and or modules which are interactive and discrete, without departing from the scope of the disclosure. Furthermore, blocks, units and/or modules in some exemplary embodiments may be physically coupled as a more complex block, unit and/or module without departing from the scope of the disclosure.

Figure 1:
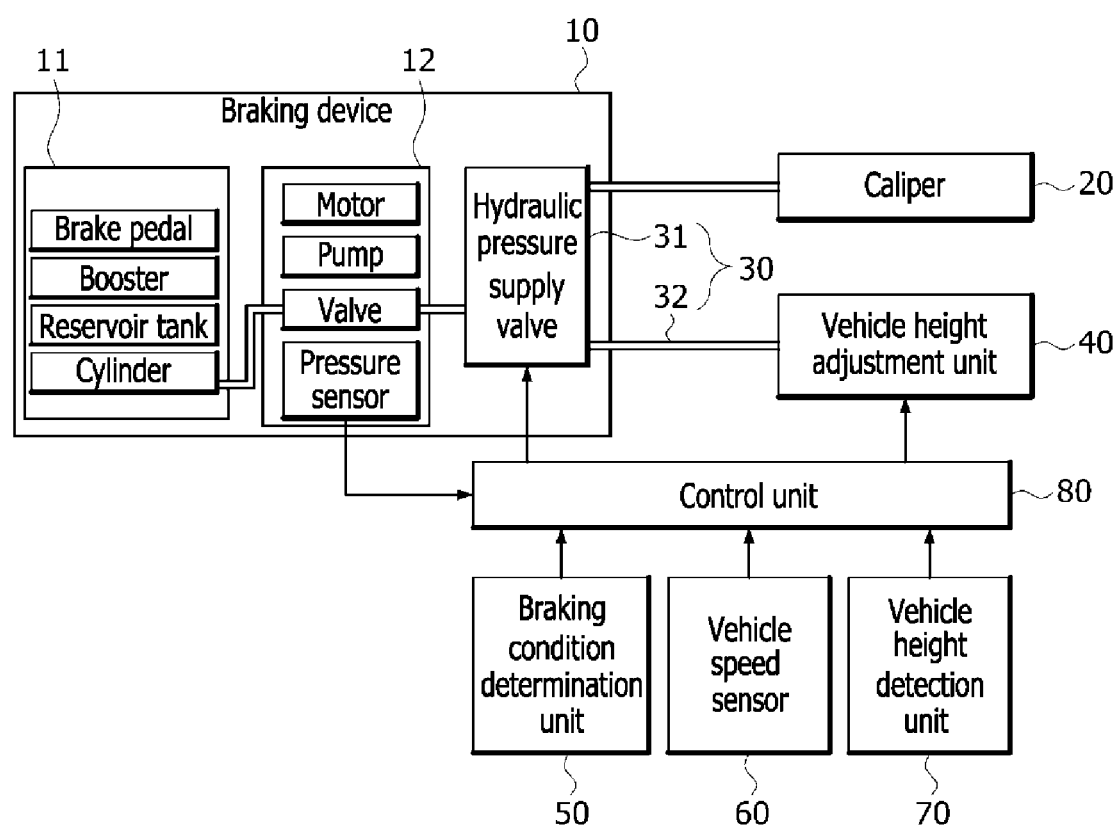
FIG. 1 is a block diagram illustrating a configuration of an apparatus for adjusting a height of a vehicle in accordance with an exemplary embodiment of the present invention.

FIG. 1 is a block diagram illustrating a configuration of an apparatus for adjusting a height of a vehicle in accordance with an exemplary embodiment of the present invention.

Referring to FIG. 1, the apparatus for adjusting a height of a vehicle includes a hydraulic pressure supply unit 30, a vehicle height adjustment unit 40, a braking condition determination unit 50, a vehicle speed sensor 60, a vehicle height detection unit 70, and a control unit 80.

The hydraulic pressure supply unit 30 shares a hydraulic pressure supplied to a caliper 20 from a braking device 10 for braking of the vehicle, and thereby supplies all or a portion of the hydraulic pressure to the vehicle height adjustment unit 40.

The braking device 10 brakes the vehicle by stopping the rotation of each wheel through supplying a hydraulic pressure, for braking of the vehicle, to the caliper 20 of each wheel.

The braking device 10 may include both a braking device 10 of an internal combustion engine vehicle and a braking device 10 of an eco-friendly vehicle. In various exemplary embodiments of the present invention discussed herein, the same reference numeral will be given to braking devices.

While the braking device 10 of an internal combustion engine vehicle and the braking device 10 of an eco-friendly vehicle are different from each other in terms of mechanical and electrical structures, they are similar to each other at least in that a hydraulic pressure for braking of the vehicle is supplied to the caliper 20.

The hydraulic pressure supply unit 30 supplies a hydraulic pressure that is supplied to the caliper 20 from each braking device 10, to the vehicle height adjustment unit 40, so that the hydraulic pressure for braking of the vehicle may be used not only to brake the vehicle, as in the conventional art, but also to adjust a height of the vehicle.

In various exemplary embodiments of the present invention, an apparatus for adjusting a height of a vehicle based on the braking device 10 of an internal combustion engine vehicle will be described with reference to FIGS. 1 to 3, and an apparatus for adjusting a height of a vehicle based on the braking device 10 of an eco-friendly vehicle will be described with reference to FIGS. 4 to 7.

In general, the braking device 10 of an internal combustion engine vehicle includes various mechanical and electrical devices, such as a brake pedal, a booster, a reservoir tank, a cylinder (a main master cylinder and a backup master cylinder), a pedal, and a valve (an inlet valve and an outlet valve). For example, if a driver's effort is applied to the brake pedal, hydraulic pressure is generated by the backup master cylinder.

A plurality of valves (hydraulic pressure adjustment valves) adjust a hydraulic pressure to be supplied to the caliper 20, and regulates a brake oil to be supplied to each wheel cylinder. The outlet valve is installed on a fluid path between each wheel cylinder and the reservoir tank, and regulates the oil discharged from each wheel cylinder.

Recently, as an anti-lock brake system (ABS) function or an electronic stability control (ECS) function has become popular in vehicles, the braking device 10 of an internal combustion engine vehicle includes an ESC hydraulic unit 12. The ESC hydraulic unit 12 shares some of respective mechanical and electrical components of an existing hydraulic pressure generation unit 11, or includes new mechanical and electrical components. The ESC hydraulic unit 12 maintains in advance a hydraulic pressure to be supplied to each wheel of the vehicle, and supplies the hydraulic pressure to at least one of calipers 20 of respective wheels when a condition to perform the ABS function or the ESC function is satisfied, thereby performing a corresponding function. The ESC hydraulic unit 12 calculates a required braking pressure through a stroke sensed by a pedal stroke measurement sensor and a pressure sensed by a sub master cylinder pressure measurement sensor, and forms a braking pressure by driving a motor depending on the calculated required braking pressure.

For reference, while FIG. 1 illustrates that the ESC hydraulic unit 12 including a motor, a pump, a valve, an ECU and so forth is disposed separately from the hydraulic pressure generation unit 11 in the braking device 10 of an internal combustion engine vehicle, it is to be noted that the ESC hydraulic unit 12 may be installed integrally with the hydraulic pressure generation unit 11.

The technical scope of the inventive concepts includes both cases where the ESC hydraulic unit 12 is disposed separately from and integrally with the hydraulic pressure generation unit 11 in the braking device 10 of an internal combustion engine vehicle, and includes all aspects so long as a hydraulic pressure is supplied to the caliper 20 from the braking device 10 of an internal combustion engine vehicle to brake the vehicle.

The hydraulic pressure supply unit 30 includes a hydraulic pressure supply valve 31 and a hydraulic pressure line 32.

The hydraulic pressure supply valve 31 is installed in the braking device 10 of an internal combustion engine vehicle, and supplies a hydraulic pressure supplied from the braking device 10, to the vehicle height adjustment unit 40. The hydraulic pressure supply valve 31 may be installed integrally with or separately from a variety of valves for supplying a hydraulic pressure for braking of the vehicle to the caliper 20, or may be installed on a braking pressure line for providing a braking hydraulic pressure.

The hydraulic pressure supply valve 31 is in a normally closed state so that, in normal times, a hydraulic pressure for braking of the vehicle may be immediately supplied to the caliper 20 from the braking device 10 of an internal combustion engine vehicle. However, if a vehicle height adjustment condition (to be described later) is satisfied, the hydraulic pressure supply valve 31 is closed toward the caliper 20 and is opened toward the vehicle height adjustment unit 40, and thereby supplies a hydraulic pressure supplied from the braking device 10 of an internal combustion engine vehicle to the vehicle height adjustment unit 40. The vehicle height adjustment condition will be described later.

The hydraulic pressure line 32 has one end connected to the hydraulic pressure supply valve 31 and the other end connected to the vehicle height adjustment unit 40, and thereby, supplies a hydraulic pressure from the hydraulic pressure supply valve 31 to the vehicle height adjustment unit 40.

As a result, the vehicle height adjustment unit 40 adjusts a height of the vehicle according to the hydraulic pressure supplied through the hydraulic pressure line 32 from the hydraulic pressure supply valve 31.

The braking condition determination unit 50 determines whether an operation state of the vehicle satisfies a braking condition of the vehicle. For example, the braking condition determination unit 50 determines whether a braking condition is satisfied, through an operation state of the brake pedal or a travel support system in the vehicle, for example, a smart cruise control (SCC) system.

Generally, the brake pedal may be determined as an on state or an off state depending on whether a driver's effort is applied thereon. Thus, by sensing whether the brake pedal is in the on state or the off state, the braking condition determination unit 50 determines that the braking condition is satisfied, when the brake pedal is in the on state, and determines that the braking condition is not satisfied, when the brake pedal is in the off state.

Also, the travel support system controls the braking of the vehicle depending on a distance to a preceding vehicle which travels ahead. In this case, the braking condition determination unit 50 determines that the braking condition is satisfied, when the distance to the preceding vehicle is equal to or shorter than a predetermined distance, and determines that the braking condition is not satisfied, when the distance to the preceding vehicle exceeds the predetermined distance.

The vehicle height detection unit 70 detects a vehicle height. The vehicle height detection unit 70 may directly sense a height of the vehicle through a relative position change of the body of the vehicle and the axle, but may estimate a height of the vehicle depending on a travel state of the vehicle, for example, a speed of the vehicle, traveling environment and a traveling road.

The vehicle speed sensor 60 senses a speed of the vehicle, and inputs the sensed speed to the control unit 80. The vehicle speed sensor 60 may sense a speed of the vehicle through a wheel speed of the vehicle or a navigation system, but the inventive concepts are not specifically limited thereto.

The vehicle height adjustment unit 40 adjusts a height of the vehicle by using a hydraulic pressure supplied from the hydraulic pressure supply unit 30. The vehicle height adjustment unit 40 may be provided to a suspension, which adjusts a height of the vehicle by using a hydraulic pressure, and may include all aspects so long as a height of the vehicle is adjusted by using the corresponding hydraulic pressure. The vehicle height adjustment unit 40 may include an oil chamber (not illustrated) which expands or contracts depending on a hydraulic pressure supplied form the hydraulic pressure supply unit 30.

The control unit 80 determines whether a vehicle height adjustment condition is satisfied, when it is determined by the braking condition determination unit 50 that an operation state of the vehicle satisfies the braking condition, and depending on a determination result, supplies a hydraulic pressure of the braking device 10 of an internal combustion engine vehicle to the vehicle height adjustment unit 40 by controlling the hydraulic pressure supply unit 30.

That is to say, if a driver presses the brake pedal or a distance to a preceding vehicle is within the predetermined distance, the braking device 10 of an internal combustion engine vehicle supplies a hydraulic pressure for braking the vehicle, to the caliper 20.

If it is determined by the braking condition determination unit 50 that the braking condition is satisfied, the control unit 80 detects a hydraulic pressure supplied to the caliper 20 from the braking device 10 of an internal combustion engine vehicle, through an ECU or the like in the braking device 10 of an internal combustion engine vehicle, and determines whether the detected hydraulic pressure is equal to or greater than a predetermined hydraulic pressure.

The predetermined hydraulic pressure is a target braking pressure that needs to be supplied to the caliper 20 from the braking device 10. The target braking pressure is a minimum hydraulic pressure necessary for braking the vehicle, and may be variously determined depending on a position of the brake pedal, a vehicle speed, and traveling environment.

In general, the braking device 10 of an internal combustion engine vehicle is a safety system which is essentially needed in the vehicle. Therefore, a hydraulic pressure necessary to brake the vehicle should be always secured for the braking of the vehicle.

If it is determined by the braking condition determination unit 50 that the braking condition is satisfied, the control unit 80 determines whether a hydraulic pressure of the braking device 10 of an internal combustion engine vehicle is equal to or greater than the target braking pressure necessary for braking of the vehicle. As a result of the determination, if a hydraulic pressure of the braking device 10 of an internal combustion engine vehicle is less than the target braking pressure, the control unit 80 allows a height of the vehicle to be adjusted after the vehicle is stopped or the braking device 10 is in a deactivated state.

In other words, the control unit 80 determines that the vehicle is stopped when a vehicle speed sensed by the vehicle speed sensor 60 is 0 km/h, and if the braking device 10 does not operate to any additional degree, determines whether a vehicle height adjustment condition for vehicle height adjustment is satisfied.

If a hydraulic pressure of the braking device 10 of an internal combustion engine vehicle is equal to or greater than the target braking pressure, the control unit 80 determines whether the vehicle height adjustment condition is satisfied.

If a driver is willing to adjust a height of the vehicle or a traveling state of the vehicle corresponds to a state in which vehicle height adjustment should be performed, it may be determined that a vehicle height adjustment condition is satisfied. The control unit 80 performs vehicle height adjustment depending on whether such a vehicle height adjustment condition is satisfied.

For example, the control unit 80 determines whether the vehicle height adjustment condition is satisfied based on at least one of: a vehicle height adjustment button input, a vehicle speed, a traveling time, and a vehicle position.

In this case, the control unit 80 determines that the vehicle height adjustment condition is satisfied when a vehicle height adjustment button is inputted, a vehicle speed is equal to or greater than a predetermined speed, for example, 100 km/h, the vehicle travels for at least a predetermined time at a speed over a predetermined speed, or a position of the vehicle is a highway.

When the vehicle height adjustment condition is satisfied, the control unit 80 determines whether a vehicle height detected by the vehicle height detection unit 70 corresponds to a predetermined target vehicle height.

The target vehicle height may be a vehicle height that is set to the vehicle height adjustment button when the vehicle height adjustment button is inputted by the driver, and may be a vehicle height that is set to a corresponding traveling state, when the vehicle travels for at least a predetermined time at a speed equal to or faster than 100 km/h or a position of the vehicle is a highway.

As a result of the determination, if a vehicle height detected by the vehicle height detection unit 70 is different from the target vehicle height, the control unit 80 adjusts a height of the vehicle by supplying a hydraulic pressure of the braking device 10 of an internal combustion engine vehicle to the vehicle height adjustment unit 40, through controlling the hydraulic pressure supply valve 31, and repeats this process until a vehicle height equals the target vehicle height.

Hereafter, a method for adjusting a height of a vehicle in accordance with an exemplary embodiment of the present invention will be described in detail with reference to FIG. 2.

Figure 2:
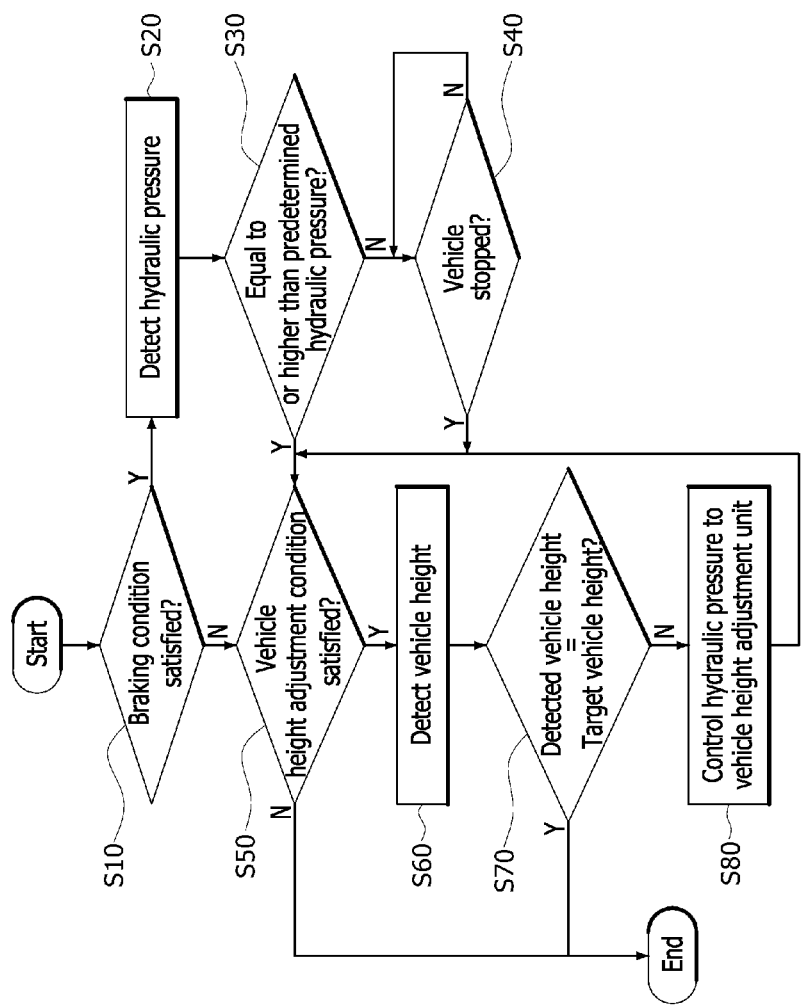
FIG. 2 is a flow chart explaining a method for adjusting a height of a vehicle in accordance with an exemplary embodiment of the present invention.

FIG. 2 is a flow chart explaining a method for adjusting a height of a vehicle in accordance with an exemplary embodiment of the present invention.

Referring to FIG. 2, first, the braking condition determination unit 50 determines whether an operation state of the vehicle satisfies the braking condition (S10).

As a result of the determination at the step S10, if it is determined that the braking condition is satisfied, the control unit 80 detects a hydraulic pressure supplied to the caliper 20 from the braking device 10 of an internal combustion engine vehicle, through an ECU or the like in the braking device 10 of an internal combustion engine vehicle (S20).

As a hydraulic pressure supplied to the caliper 20 from the braking device 10 of an internal combustion engine vehicle, the control unit 80 determines whether the hydraulic pressure detected as described above is equal to or higher than the predetermined hydraulic pressure (S30).

As a result of the determination at the step S30, if the hydraulic pressure of the braking device 10 of an internal combustion engine vehicle is equal to or higher than the predetermined hydraulic pressure, the control unit 80 determines whether the vehicle height adjustment condition is satisfied (S50). If the hydraulic pressure of the braking device 10 of an internal combustion engine vehicle is lower than the predetermined hydraulic pressure, the control unit 80 determines whether the vehicle is in a stopped state, based on a vehicle speed sensed by the vehicle speed sensor 60 (S40).

As a result of the determination at the step S40, if the vehicle is in a stopped state, the control unit 80 determines whether the vehicle height adjustment condition is satisfied (S50).

As a result of the determination at the step S50, if the vehicle height adjustment condition is satisfied, the control unit 80 detects a vehicle height through the vehicle height detection unit 70 (S60), and determines whether the detected vehicle height and the target vehicle height are equal to each other (S70).

As a result of the determination at the step (S70), if the vehicle height and the target vehicle height are equal to each other, vehicle adjustment is ended. On the other hand, if the vehicle height and the target vehicle height are not equal to each other, the control unit 80 adjusts a height of the vehicle by supplying a hydraulic pressure of the braking device 10 of an internal combustion engine vehicle to the vehicle height adjustment unit 40 through the hydraulic pressure supply valve 31 (S80).

In the above exemplary embodiment, the hydraulic pressure supply valve 31 is installed in the braking device 10 of an internal combustion engine vehicle. However, the hydraulic pressure supply valve 31 may be installed separately from the braking device 10 of an internal combustion engine vehicle.

Figure 3:
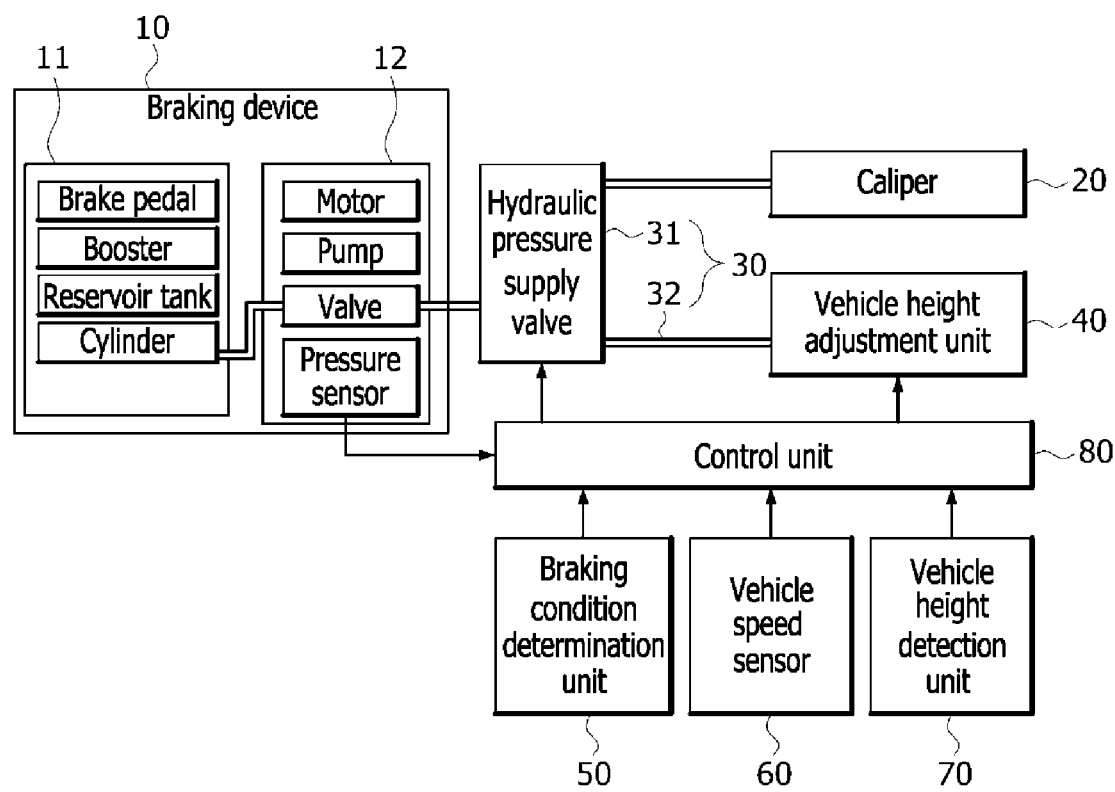
FIGS. 3, 4, 5, 6, and 7 are block diagrams illustrating examples of the configurations of apparatuses for adjusting a height of a vehicle, applied to a braking device, in accordance with exemplary embodiments of the present invention.

FIG. 3 is a block diagram illustrating a a configuration of an apparatus for adjusting a height of a vehicle, applied to a braking device, in accordance with an additional exemplary embodiment of the present invention.

Referring to FIG. 3, the apparatus for adjusting a height of a vehicle, applied to a braking device, in accordance with the additional exemplary embodiment of the present invention, includes a hydraulic pressure supply unit 30, a vehicle height adjustment unit 40, a braking condition determination unit 50, a vehicle speed sensor 60, a vehicle height detection unit 70, and a control unit 80.

In the additional exemplary embodiment, the same reference numerals will be used for the same components as those of the previous exemplary embodiment described above, and detailed descriptions thereof will be omitted. The operation of the apparatus for adjusting a height of a vehicle in accordance with the additional exemplary embodiment of the present invention is the same as that of the exemplary embodiment described above.

In the apparatus for adjusting a height of a vehicle in accordance with the additional exemplary embodiment, the hydraulic pressure supply valve 31 may be installed separately from the braking device 10 of an internal combustion engine vehicle.

Namely, while the hydraulic pressure supply valve 31 is installed in the braking device 10 of an internal combustion engine vehicle in the one exemplary embodiment described above, in the additional exemplary embodiment, the hydraulic pressure supply valve 31 is installed separately from the braking device 10 of an internal combustion engine vehicle and thereby supplies a hydraulic pressure to the vehicle height adjustment unit 40 from the braking device 10 of an internal combustion engine vehicle.

In the one exemplary embodiment and the additional exemplary embodiment of the present invention described above, an apparatus for adjusting a height of a vehicle is applied to the braking device 10 of an internal combustion engine vehicle.

However, an apparatus for adjusting a height of a vehicle may also be applied to the braking device 10 of an eco-friendly vehicle (Electric Vehicle, Hybrid Vehicle, Hydrogen Fuel Cell Vehicle, etc.). This will be described below with reference to FIGS. 4 to 7.

Figure 4:
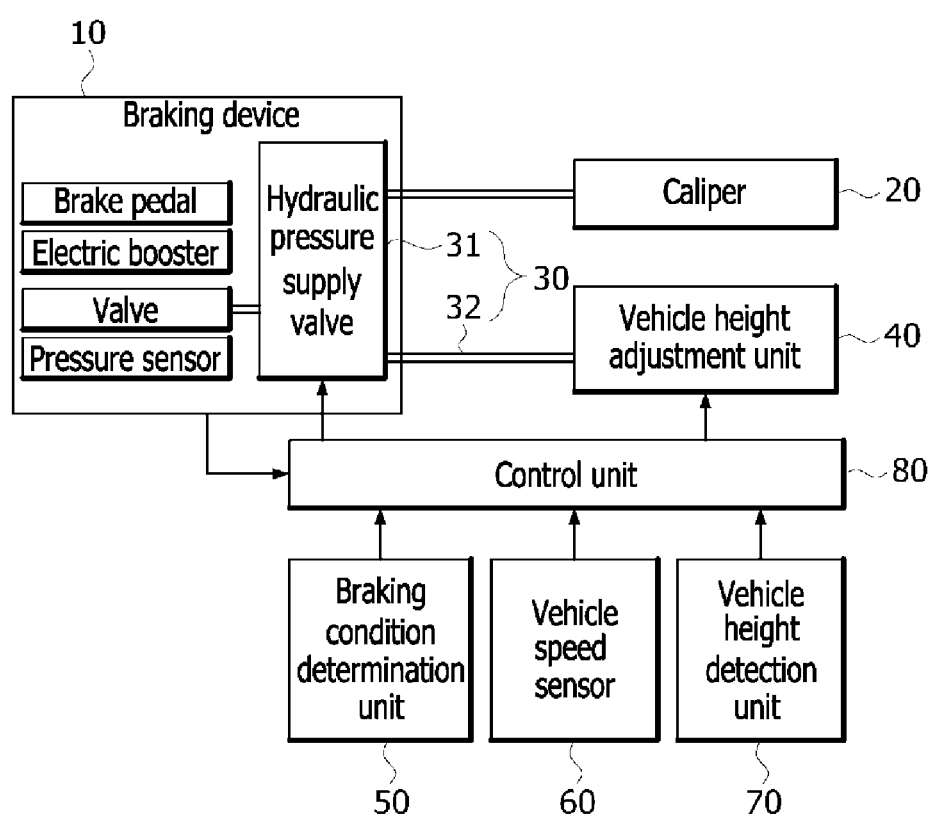

Referring to FIG. 4, an apparatus for adjusting a height of a vehicle in accordance with an exemplary embodiment of the present invention includes a hydraulic pressure supply unit 30, a vehicle height adjustment unit 40, a braking condition determination unit 50, a vehicle speed sensor 60, a vehicle height detection unit 70, and a control unit 80. In the present exemplary embodiment, detailed descriptions for the same components as those of the aforementioned exemplary embodiments will be omitted.

In the present exemplary embodiment, the hydraulic pressure supply valve 31 of the hydraulic pressure supply unit 30 may be installed in the braking device 10 of an eco-friendly vehicle, and the hydraulic pressure line 32 may be connected between the hydraulic pressure supply valve 31 and the vehicle height adjustment unit 40 such that a hydraulic pressure of the braking device 10 of an eco-friendly vehicle is supplied to vehicle height adjustment unit 40 through the hydraulic pressure supply valve 31 and the hydraulic pressure line 32.

The operation of the apparatus for adjusting a height of a vehicle in accordance with the present exemplary embodiment is the same as that of the aforementioned exemplary embodiments.

The braking device 10 of an eco-friendly vehicle includes a brake pedal, an electric booster, a valve, a pressure sensor, and an ECU. In general, a motor, a pump, a valve, and a pressure sensor are integrated, and a hydraulic pressure for braking a vehicle may be generated by the motor and the pump (or a cylinder).

In such a braking device 10 of an eco-friendly vehicle, if the brake pedal is pressed by a driver, the motor is driven, and accordingly, as the cylinder is actuated, a hydraulic pressure for braking a vehicle is supplied to the caliper 20 through a valve.

For reference, it was described in the present exemplary embodiment that the brake pedal, the motor, the valve, the pressure sensor and the ECU are included in the braking device 10 of an eco-friendly vehicle, but a variety of mechanical and electrical devices may be included, and the technical scope of the inventive concepts may cover all kinds of braking device 10 of an eco-friendly vehicle.

In the apparatus for adjusting a height of a vehicle in accordance with the present exemplary embodiment, it was described as an example that the hydraulic pressure supply valve 31 is installed in the braking device 10 of an eco-friendly vehicle.

However, the hydraulic pressure supply valve 31 may be installed outside the braking device 10 of an eco-friendly vehicle.

Figure 5:
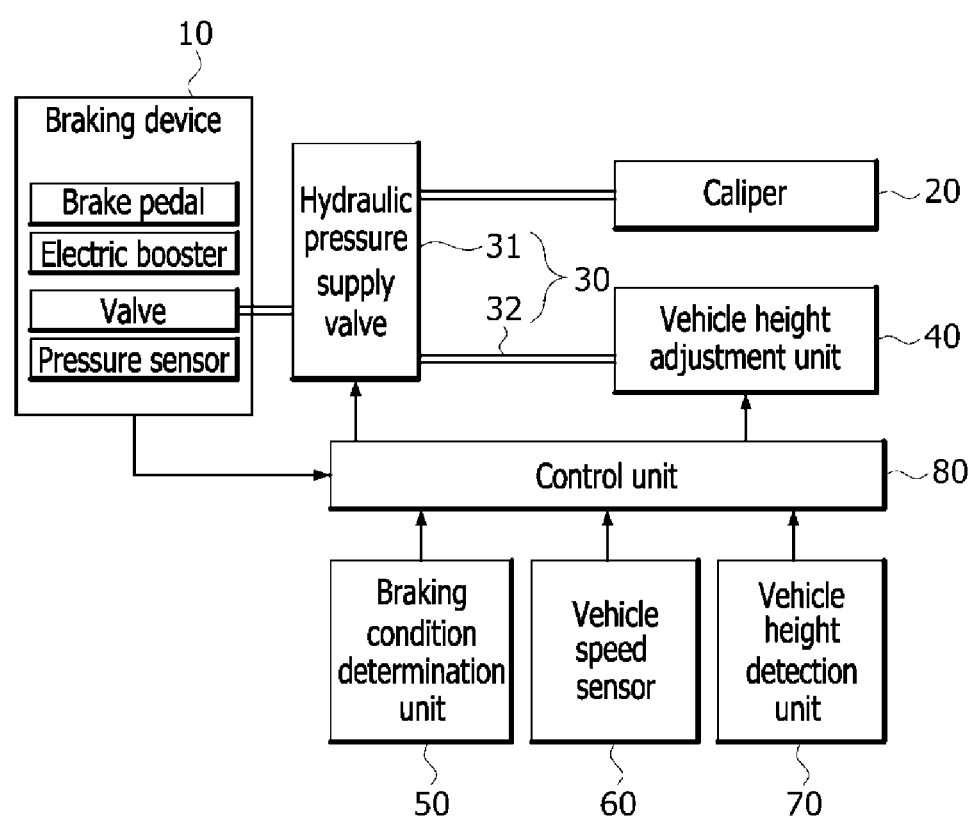

Referring to FIG. 5, an apparatus for adjusting a height of a vehicle in accordance with an embodiment of the disclosure includes a hydraulic pressure supply unit 30, a vehicle height adjustment unit 40, a braking condition determination unit 50, a vehicle speed sensor 60, a vehicle height detection unit 70, and a control unit 80. In the present exemplary embodiment, detailed descriptions for the same components as those of the aforementioned exemplary embodiments will be omitted.

The operation of the apparatus for adjusting a height of a vehicle in accordance with the present exemplary embodiment is the same as that of the aforementioned exemplary embodiments.

In the apparatus for adjusting a height of a vehicle in accordance with the present exemplary embodiment of the disclosure, the hydraulic pressure supply valve 31 of the hydraulic pressure supply unit 30 may be installed separately from the braking device 10 of an eco-friendly vehicle.

Namely, while the hydraulic pressure supply valve 31 is installed in the braking device 10 of an eco-friendly vehicle in the embodiment of the disclosure described above with reference to FIG. 4, in the present exemplary embodiment, the hydraulic pressure supply valve 31 is installed separately from the braking device 10 of an eco-friendly vehicle, and thereby supplies a hydraulic pressure to the vehicle height adjustment unit 40 from the braking device 10 of an eco-friendly vehicle.

In the case of an eco-friendly vehicle, the vehicle may also be operated by a motor in addition to an internal combustion engine, for example, an engine, of the vehicle. Therefore, since the eco-friendly vehicle should be able to be braked even though the engine does not operate, the eco-friendly vehicle needs to be braked by using a hydraulic pressure stored in a motor pump and an accumulator. Apparatuses for adjusting a height of a vehicle, applied to such an eco-friendly vehicle, will be described with reference to FIGS. 6 and 7.

Figure 6:
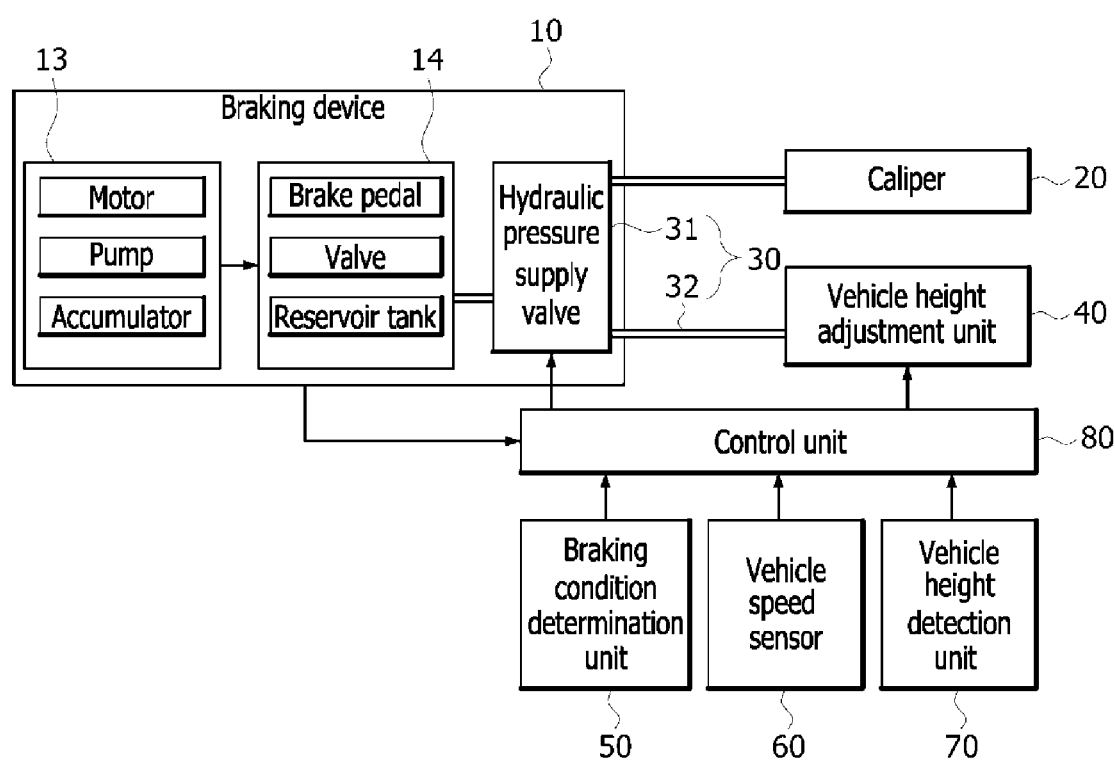

Referring to FIG. 6, an apparatus for adjusting a height of a vehicle in accordance with an exemplary embodiment of the present invention includes a hydraulic pressure supply unit 30, a vehicle height adjustment unit 40, a braking condition determination unit 50, a vehicle speed sensor 60, a vehicle height detection unit 70, and a control unit 80.

In the apparatus for adjusting a height of a vehicle in accordance with the present exemplary embodiment of the present invention, the hydraulic pressure supply valve 31 of the hydraulic pressure supply unit 30 may be connected with a valve block 14 in the braking device 10 of an eco-friendly vehicle.

In the braking device 10 of an eco-friendly vehicle illustrated in FIG. 6, a hydraulic pressure generation unit 13 including a motor and a pump is constructed separately from the valve block 14, and if a hydraulic pressure stored in the accumulator of the hydraulic pressure generation unit 13 is transferred to the valve block 14, the valve block 14 supplies the hydraulic pressure transferred from the accumulator, to the caliper 20.

As described above, the hydraulic pressure supply valve 31 is connected to the valve block 14; shares a hydraulic pressure supplied to the valve block 14 to the caliper 20; and, as a result; selectively supplies a hydraulic pressure supplied from the valve block 14, to the vehicle height adjustment unit 40.

The operation process of the apparatus for adjusting a height of a vehicle in accordance with the present exemplary embodiment is the same as that of the aforementioned exemplary embodiments.

In the present exemplary embodiment, it is illustrated as an example that the hydraulic pressure supply valve 31 is connected to a valve block. However, without departing from the technical scope of the inventive concepts, the hydraulic pressure supply valve 31 may be directly connected to the accumulator.

Figure 7:
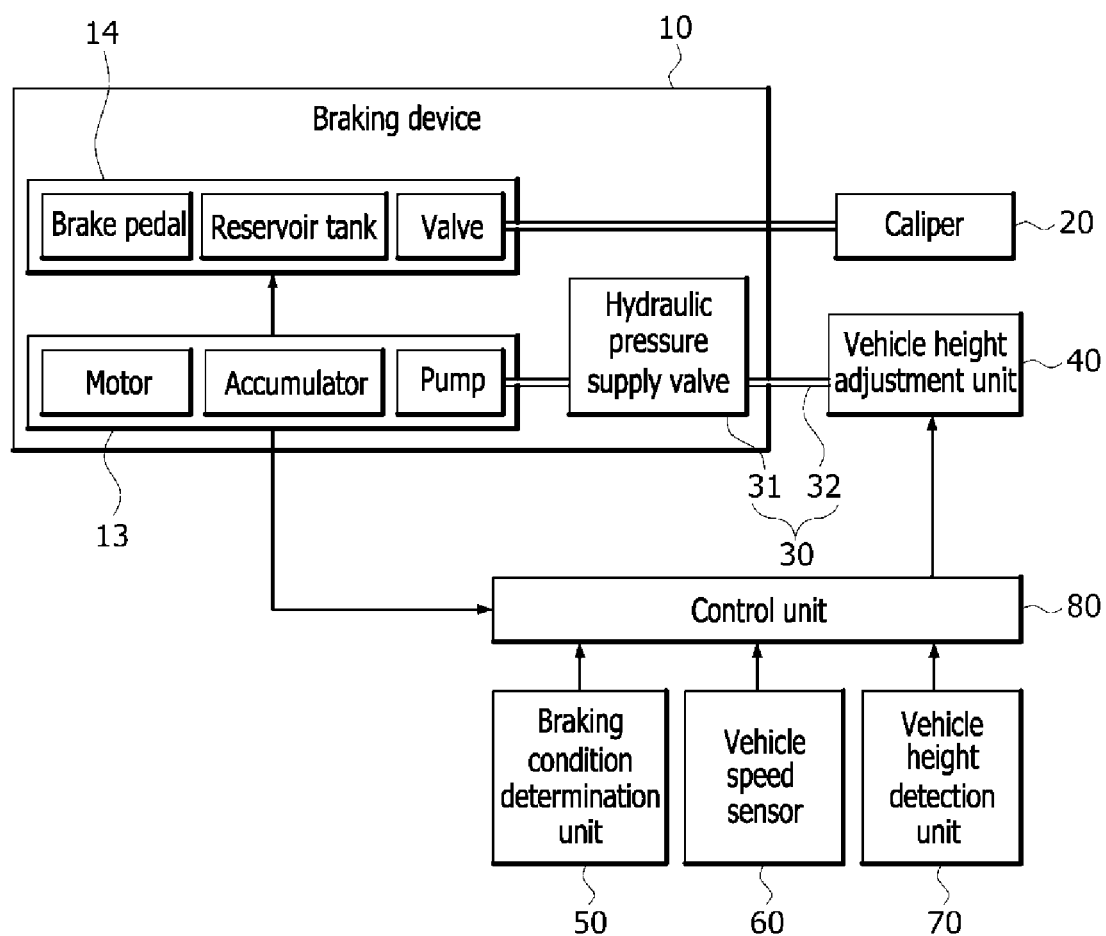

Referring to FIG. 7, an apparatus for adjusting a height of a vehicle in accordance with an exemplary embodiment of the present invention includes a hydraulic pressure supply unit 30, a vehicle height adjustment unit 40, a braking condition determination unit 50, a vehicle speed sensor 60, a vehicle height detection unit 70, and a control unit 80.

In the apparatus for adjusting a height of a vehicle in accordance with the present exemplary embodiment of the present invention, the hydraulic pressure supply valve 31 of the hydraulic pressure supply unit 30 may be connected to the hydraulic pressure generation unit 13 in the braking device 10 of an eco-friendly vehicle.

The accumulator of the hydraulic pressure generation unit 13 supplies a hydraulic pressure to the valve block 14 as described above, and, as the hydraulic pressure supply valve 31 is connected to the hydraulic pressure generation unit 13, a hydraulic pressure of the accumulator may be directly supplied to the vehicle height adjustment unit 40.

That is to say, the hydraulic pressure supply valve 31 is connected with the hydraulic pressure generation unit 13 in the braking device 10 of an eco-friendly vehicle, and supplies a hydraulic pressure stored in the accumulator of the hydraulic pressure generation unit 13 to the vehicle height adjustment unit 40 so that, through this arrangement, a height of the vehicle may be adjusted.

As is apparent from the above descriptions, in the apparatus and method for adjusting a height of a vehicle according to the exemplary embodiments of the present invention, by adjusting a vehicle height by sharing a hydraulic pressure of a braking device for braking a vehicle controlling various hydraulic pressures in the vehicle, the number of parts necessary for vehicle height adjustment may be reduced, and various electrical modules in the vehicle may be simplified mechanically and structurally.

In the apparatus and method for adjusting a height of a vehicle according to the exemplary embodiments of the present invention, since the number of mechanical and structural devices for vehicle height adjustment may be reduced, a cost and a time required for manufacturing a vehicle may be significantly decreased.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. An apparatus for adjusting a height of a vehicle, comprising:
    a vehicle height adjustment unit configured to adjust a height of the vehicle;
    a hydraulic pressure supply unit configured to supply a hydraulic pressure supplied to a caliper from a braking device for braking of the vehicle, to the vehicle height adjustment unit; and
    a control unit configured to control a hydraulic pressure supplied to the vehicle height adjustment unit from the braking device, by controlling the hydraulic pressure supply unit depending on whether a predetermined vehicle height adjustment condition is satisfied,
    wherein:
    the control unit determines whether the vehicle height adjustment condition is satisfied based on at least one of: a vehicle height adjustment button input, a vehicle speed being greater than or equal to a predetermined speed, a traveling time, and a vehicle position;
    the control unit supplies a hydraulic pressure from the braking device to the vehicle height adjustment unit by controlling the hydraulic pressure supply unit depending on whether an operation state of the vehicle satisfies a predetermined braking condition; and
    when the braking condition is satisfied, the control unit supplies a hydraulic pressure from the braking device to the vehicle height adjustment unit by controlling the hydraulic pressure supply unit depending on a comparison result by comparing a hydraulic pressure supplied to the caliper from the braking device with a predetermined hydraulic pressure.

2. The apparatus according to claim 1, further comprising:
    a vehicle height detection unit configured to detect a vehicle height,
    wherein the control unit controls the hydraulic pressure supply unit depending on a comparison result by comparing the vehicle height detected by the vehicle height detection unit with a predetermined target vehicle height.

3. The apparatus according to claim 1, wherein the hydraulic pressure supply unit comprises:
    a hydraulic pressure supply valve installed in the braking device, and configured to regulate a hydraulic pressure supplied from the braking device; and
    a hydraulic pressure line having one end connected to the hydraulic pressure supply valve and the other end connected to the vehicle height adjustment unit, and configured to supply a hydraulic pressure from the hydraulic pressure supply valve to the vehicle height adjustment unit.

4. The apparatus according to claim 1, wherein the hydraulic pressure supply unit comprises:
    a hydraulic pressure line having one end connected to the braking device and the other end connected to the vehicle height adjustment unit, and configured to supply a hydraulic pressure from the braking device to the vehicle height adjustment unit; and
    a hydraulic pressure supply valve installed on the hydraulic pressure line, and configured to regulate a hydraulic pressure supplied through the hydraulic pressure line.

5. The apparatus according to claim 1, wherein the control unit supplies a hydraulic pressure from the braking device to the vehicle height adjustment unit by controlling the hydraulic pressure supply unit when the braking condition is not satisfied.

6. The apparatus according to claim 1, wherein, if a hydraulic pressure supplied to the caliper is equal to or higher than the predetermined hydraulic pressure, the control unit supplies a hydraulic pressure from the braking device to both the vehicle height adjustment unit and the caliper by controlling the hydraulic pressure supply unit.

7. The apparatus according to claim 1, wherein, if a hydraulic pressure supplied to the caliper is lower than the predetermined hydraulic pressure, the control unit supplies a hydraulic pressure from the braking device to the vehicle height adjustment unit by controlling the hydraulic pressure supply unit when the vehicle is stopped.

8. The apparatus according to claim 1, wherein the predetermined hydraulic pressure is a target braking pressure that is necessary to be supplied to the caliper from the braking device.

9. A method for adjusting a height of a vehicle, comprising:
    determining whether a predetermined vehicle height adjustment condition is satisfied, by a control unit;
    detecting a vehicle height by a vehicle height detection unit, when the vehicle height adjustment condition is satisfied; and
    adjusting, by the control unit, the vehicle height by supplying a hydraulic pressure supplied through a hydraulic pressure supply unit from a braking device for braking of the vehicle to a vehicle height adjustment unit depending on the vehicle height,
    wherein:
    in the determining of whether the predetermined vehicle height adjustment condition is satisfied, the control unit determines whether the vehicle height adjustment condition is satisfied, based on at least one of: a vehicle height adjustment button input, a vehicle speed being greater than or equal to a predetermined speed, a traveling time, and a vehicle position; and
    in the adjusting of the vehicle height, when an operation state of the vehicle satisfies the predetermined braking condition, the control unit supplies a hydraulic pressure from the braking device to the vehicle height adjustment unit by controlling the hydraulic pressure supply unit depending on a comparison result by comparing a hydraulic pressure supplied to a caliper from the braking device with a predetermined hydraulic pressure.

10. The method according to claim 9, wherein the hydraulic pressure supply unit comprises:
   a hydraulic pressure supply valve installed in the braking device, and configured to regulate a hydraulic pressure supplied from the braking device; and
   a hydraulic pressure line having one end connected to the hydraulic pressure supply valve and the other end connected to the vehicle height adjustment unit, and configured to supply a hydraulic pressure from the hydraulic pressure supply valve to the vehicle height adjustment unit.

11. The method according to claim 9, wherein the hydraulic pressure supply unit comprises:
   a hydraulic pressure line having one end connected to the braking device and the other end connected to the vehicle height adjustment unit, and configured to supply a hydraulic pressure from the braking device to the vehicle height adjustment unit; and
   a hydraulic pressure supply valve installed on the hydraulic pressure line, and configured to regulate a hydraulic pressure supplied through the hydraulic pressure line.

12. The method according to claim 9, wherein, in the adjusting of the vehicle height, the control unit supplies a hydraulic pressure from the braking device to the vehicle height adjustment unit by controlling the hydraulic pressure supply unit when an operation state of the vehicle does not satisfy a predetermined braking condition.

13. The method according to claim 9, wherein, in the adjusting of the vehicle height, if a hydraulic pressure supplied to the caliper is equal to or higher than the predetermined hydraulic pressure, the control unit supplies a hydraulic pressure from the braking device to both the vehicle height adjustment unit and the caliper by controlling the hydraulic pressure supply unit.

14. The method according to claim 9, wherein, in the adjusting of the vehicle height, if a hydraulic pressure supplied to the caliper is lower than the predetermined hydraulic pressure, the control unit supplies a hydraulic pressure from the braking device to the vehicle height adjustment unit by controlling the hydraulic pressure supply unit when the vehicle is stopped.

15. The method according to claim 9, wherein the predetermined hydraulic pressure is a target braking pressure that is necessary to be supplied to the caliper from the braking device.

16. An apparatus for adjusting a height of a vehicle, comprising:
   a vehicle height adjustment unit configured to adjust a height of the vehicle;
   a hydraulic pressure supply unit configured to supply a hydraulic pressure supplied to a caliper from a braking device for braking of the vehicle, to the vehicle height adjustment unit; and
   a control unit configured to control a hydraulic pressure supplied to the vehicle height adjustment unit from the braking device, by controlling the hydraulic pressure supply unit depending on whether a predetermined vehicle height adjustment condition is satisfied,
   wherein the hydraulic pressure supply unit comprises:
      a hydraulic pressure supply valve installed in the braking device, and configured to regulate a hydraulic pressure supplied from the braking device; and
      a hydraulic pressure line having one end connected to the hydraulic pressure supply valve and the other end connected to the vehicle height adjustment unit, and configured to supply a hydraulic pressure from the hydraulic pressure supply valve to the vehicle height adjustment unit.

\* \* \* \* \*